(12) United States Patent
La Deaux

(10) Patent No.: US 7,537,454 B1
(45) Date of Patent: May 26, 2009

(54) NUMERICAL MULTIPLICATION TEACHING METHOD

(76) Inventor: Chris La Deaux, P.O. Box 2268, Shingle Springs, CA (US) 95682

( * ) Notice: Subject to any disclaimer, the term of this patent is extended or adjusted under 35 U.S.C. 154(b) by 889 days.

(21) Appl. No.: 10/896,422

(22) Filed: Jul. 21, 2004

Related U.S. Application Data

(60) Provisional application No. 60/489,801, filed on Jul. 24, 2003.

(51) Int. Cl.
*G09B 19/02* (2006.01)
(52) U.S. Cl. .................................. 434/188; 434/209
(58) Field of Classification Search ............... 434/188, 434/191, 207, 209
See application file for complete search history.

(56) References Cited

U.S. PATENT DOCUMENTS

| | | | | |
|---|---|---|---|---|
| 2,336,742 A | * | 12/1943 | Maguire | 434/198 |
| 2,654,963 A | * | 10/1953 | Van Dijck | 434/207 |
| D173,363 S | * | 11/1954 | Louis | D19/64 |
| 2,901,839 A | * | 9/1959 | Huff | 434/207 |
| 3,014,285 A | * | 12/1961 | Johnson | 434/191 |
| 3,061,947 A | * | 11/1962 | Faudree | 434/205 |
| 3,290,798 A | * | 12/1966 | Gilbert | 434/191 |
| 3,491,193 A | * | 1/1970 | Bianchi | 434/348 |
| 4,173,834 A | * | 11/1979 | Arzola | 434/209 |
| 4,258,477 A | * | 3/1981 | Ishiyama | 434/202 |
| 4,493,654 A | * | 1/1985 | Stuart | 434/347 |
| 4,634,385 A | * | 1/1987 | Stemper | 434/198 |
| 6,075,968 A | * | 6/2000 | Morris et al. | 434/350 |
| 6,155,836 A | * | 12/2000 | Hancock | 434/188 |
| 6,447,300 B1 | * | 9/2002 | Greenberg | 434/188 |
| 6,716,033 B1 | * | 4/2004 | Lassowsky | 434/205 |
| 7,077,654 B2 | * | 7/2006 | Burtness | 434/191 |
| 2006/0286515 A1 | * | 12/2006 | Heil | 434/207 |

\* cited by examiner

*Primary Examiner*—Kurt Fernstrom
(74) *Attorney, Agent, or Firm*—Thomas R. Lampe

(57) ABSTRACT

A motivational, multisensory method of teaching multiplication utilizing visual, auditory and kinesthetic senses simultaneously.

10 Claims, 8 Drawing Sheets

{ Say the bottom number first. ×1/2 One times two is two.

Through the 2's — Picture the card in your mind.

Name_____
Date_____

| 1 | 2 | 3 | 4 | 5 | 6 |
|---|---|---|---|---|---|
| ×2 | ×2 | ×2 | ×2 | ×2 | ×2 |

| 7 | 8 | 9 | 10 | 11 | 12 |
|---|---|---|---|---|---|
| ×2 | ×2 | ×2 | ×2 | ×2 | ×2 |

| 3 | 5 | 9 | 11 | 2 | 8 |
|---|---|---|---|---|---|
| ×2 | ×2 | ×2 | ×2 | ×2 | ×2 |

| 7 | 12 | 1 | 4 | 10 | 6 |
|---|----|---|---|----|---|
| ×2 | ×2 | ×2 | ×2 | ×2 | ×2 |

| 9 | 2 | 5 | 11 | 8 | 3 |
|---|---|---|----|---|---|
| ×2 | ×2 | ×2 | ×2 | ×2 | ×2 |

| 10 | 1 | 6 | 7 | 4 | 12 |
|----|---|---|---|---|----|
| ×2 | ×2 | ×2 | ×2 | ×2 | ×2 |

When your answer has two digits like 16, you put down the 6 and carry the 1 over the number in the 10's place.

```
  1
 68
x 2
136
```

Name_____

Date_____

Through the 2's — *Picture the card in your mind.*

```
   1
  23      68      45      70      91
 x 2     x 2     x 2     x 2     x 2
  46     136

60      92      37      84      15
 x 2     x 2     x 2     x 2     x 2

54      73      19      26      80
 x 2     x 2     x 2     x 2     x 2

98      30      62      51      47
 x 2     x 2     x 2     x 2     x 2
```

{ The numbers are getting bigger, but you can do them!

Name_____
Date_____

Through the 2's — Picture the card in your mind.

```
  1              1
 2,170         6,305         8,900         3,064
x    2        x    2        x    2        x    2
—————         ——————        —————         —————
 4,340        12,610

8,245         7,069         1,380         7,900
x    2        x    2        x    2        x    2
—————         —————         —————         —————

6,000         4,705         7,280         9,351
x    2        x    2        x    2        x    2
—————         —————         —————         —————

9,063         8,104         2,500         4,976
x    2        x    2        x    2        x    2
—————         —————         —————         —————
```

When there are zeros in the bottom number, drop the zeros down first and then move to the next number to the left and multiply like you have been doing.

52
x 10
520

Name_____

Date_____

*Through the* 2's *Picture the card in your mind.*

```
     52           52          521           521
  x   2        x  20        x  20         x 200
    104        1,040       10,420        104,200

36           36          362           362
  x   2        x  20        x  20         x 200

74           74          745           745
  x   2        x  20        x  20         x 200

91           91          918           918
  x   1        x  20        x  10         x 200
```

When you multiply the bottom number in the 10's place you must put the place holder (0) down first.

```
  64
x 11
  64
 640
 704
```

Name _____

Date _____

*Through the* 2's *Picture this card in your mind.*

```
   13          52           27          85
x  20       x  20        x  12       x  20
  260          1
             128
            1280
            1408

29          74           58          16
x  21       x  10        x  22       x  12

53          26           94          80
x  20       x  22        x  21       x  10

47          30           56          91
x  12       x  22        x  10       x  21
```

When the bottom number is a 3 digit number with no zeros you will use two place holders (0's) in the third number down from the problem line. When the bottom number has a zero in the middle you will also use two place holders (0's), but there will only be two numbers to add under the problem line.

```
   635        842
x  111     x  101
   635        842
  635        84,200
 6,350       85,042
65,500
70,485
```

Name_____

Date_____

```
    1
   635          940          701          800
x  211       x  220       x  100       x  202
   635         1              70,100       1,600
  6350        18,800                      160,000
 1                1                        161,600
127,000       188,000
133,985       206,800

204          700          936          850
x  122       x  120       x  102       x  200

760          409          500          283
x  100       x  210       x  221       x  102

900          481          620          703
x  200       x  120       x  112       x  102
```

NUMERICAL MULTIPLICATION TEACHING METHOD

This application is based on and claims the benefit of U.S. Provisional Application No. 60/489,801, filed on Jul. 24, 2003.

TECHNICAL FIELD

This invention relates to a method of teaching and more particularly to a method utilized to teach one or more students numerical multiplication. The system of instruction utilizes visual, auditory and kinesthetic senses simultaneously to learn the program's multiplication facts.

BACKGROUND OF THE INVENTION

Prior art techniques for teaching numerical multiplication typically involve the teaching of the times tables, often depending on simple rote memorization techniques. Many students find the approach boring and struggle with learning the multiplication tables. Many students go through the frustration and embarrassment of not being able to keep up with the class in math because they have not mastered the multiplication facts.

DISCLOSURE OF INVENTION

The method of the present invention utilizes a multi-sensory approach for students to master multiplication facts. The method provides for integration of the senses in the instruction of the foundational skills critical for success in many students and which will enhance and expedite learning the facts for all students. The method is applicable to students of all academic strengths, including those who have moderate to severe learning challenges. The method can be utilized for whole class instruction, small group instruction, remedial instruction and in one-to-one tutorial sessions. The program is easy to use and is designed for students to progress at their own pace. Utilizing the method, all students can be successful as they will never be confronted with multiplication facts with which they have not had prior practice.

The method of the invention is highly motivating with many helpful reminders and examples of new concepts throughout the program.

The motivational multi-sensory method of teaching numerical multiplication of the present invention includes the step of presenting a graphic display fixed in a tangible medium to at least one student relating to a selected multiplier. The graphic display is in a predetermined organizational format and shows the selected multiplier, a plurality of different multiplicands arranged sequentially and a resultant number associated with and positioned in close proximity to each of the multiplicands obtained by multiplying the selected multiplier times the multiplicand with which the resultant number is in close proximity.

The method also includes the step of manually consecutively indicating on the graphic display, as by pointing, the selected multiplier, a multiplicand and the resultant number obtained by multiplying the indicated multiplicand and the selected multiplier.

While manually indicating the selected multiplier, the multiplicand and the resultant number, the at least one student is caused to also indicate by movement the selected multiplier, the multiplicand and the resultant number. The method also includes the step of causing the at least one student to recite the indicated selected multiplier times the indicated multiplicand and the indicated resultant number.

Other features, advantages and objects of the present invention will become apparent with reference to the following description and accompanying drawings.

BEST MODE FOR CARRYING OUT THE INVENTION

Following is an explicit example of how to use the method of this invention. The Two's (see FIGS. 1-8) is being used as an example and is the selected multiplier. It will be appreciated that the method is to be followed with respect to all numbers through the Twelve's as the Two's example is representative of all of the remaining numbers, one through twelve. A Pre/Post Assessment is included to determine where student(s) should begin.

To begin the method turn to the answer card (FIG. 1) for the Two's. With your student(s) examine the card looking for patterns, associations to shapes and graphics, sequence of numbers, distribution of numbers from row to row, numbers that have connecting lines and any other observations that may be made. Explain to your student(s) that numbers are connected when the numbers are all in the twenties, thirties, etc. Have students read the helpful reminders at the top of each page. Say and point to the twelve multiples of two (two, four, six, eight, ten, twelve, fourteen, sixteen, eighteen, twenty, twenty-two, twenty-four) with your student(s) three times, stamping your foot to the count of each number that does not have a connecting line and sliding your finger along the horizontal line in the bottom row. Talk to your student(s) about the configuration of the card—that there are five numbers in the top row, four numbers in the middle row and three numbers in the bottom row. For students in the classroom who are looking at an overhead projection, they can point on their desk to imaginary numbers, sliding their pointer finger along the imaginary horizontal connecting line in the bottom row. Next, instruct your student(s) to watch what you point to, listen to what you say and picture in their mind the numbers (answers) in their respective shapes in the sequence that they are in on the card.

The Two's

1. Point to and touch the '2' at the top of the answer card, then the multiplicand '1' on the top row and finally the resultant number '2' in the circle (your finger should touch the card under the circle leaving the answer clearly exposed) and say as you are completing this 3 point step TWO TIMES ONE IS TWO. Follow this pattern for the remaining four numbers in the top row. TWO TIMES TWO IS FOUR, TWO TIMES THREE IS SIX, TWO TIMES FOUR IS EIGHT and TWO TIMES FIVE IS TEN.

2. Place your finger under each answer in the top row and say the number in each shape. Say: TWO, FOUR, SIX, EIGHT, TEN, stamping your foot to the count of each number. Do this two times taking approximately 5 seconds to read this row of numbers (answers) each time.

3. Have student(s) do the same as you did in step 2 three times, stamping their foot to the count of each number. Ask your student(s) if they think that they can remember the answers that they just practiced. If the answer is no, repeat step 2 until they feel confident that they know the answers.

Figure 1:
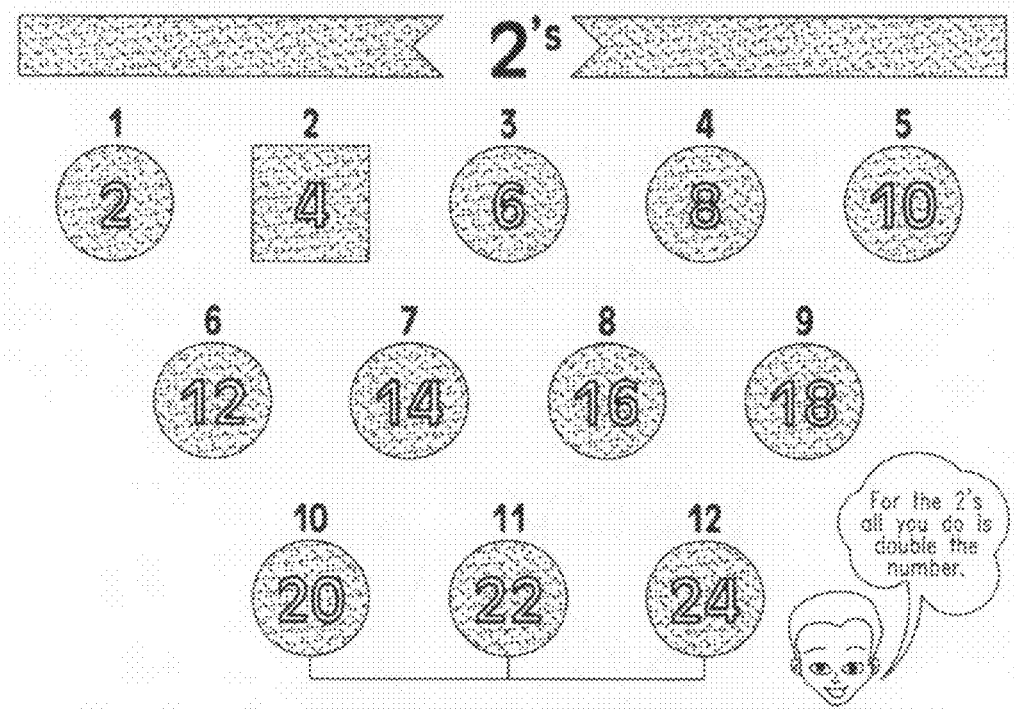
FIG. 1 depicts a graphic display employed in the method incorporated on an answer card employed when practicing the method.
Figure 2:
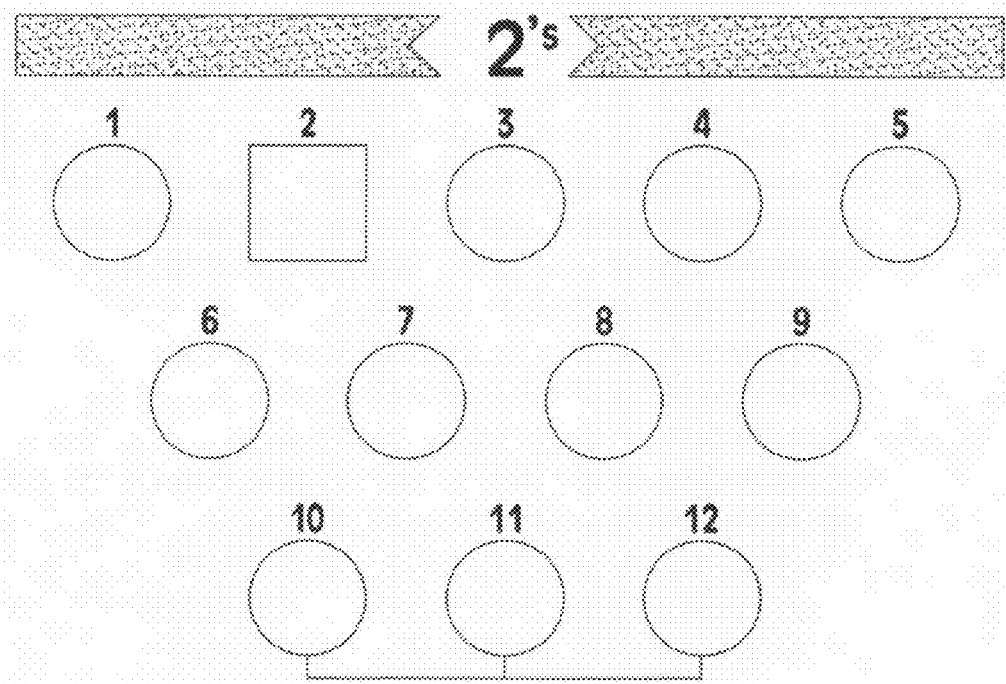
FIG. 2 is a depiction of a representative graphic display on a practice card corresponding to the answer card of FIG. 1 utilized when practicing the method of the invention.
Figure 3:
FIGS. 3-8 show representative worksheets which may be employed when practicing the method of the invention.
Figure 4:
Figure 5:
Figure 6:
Figure 7:
Figure 8:
Figure 8:

4. Turn to the Two's Practice Card (FIG. 2). Ask: What is two times one? Place your finger under the circle/graphic that you are asking about. Follow this procedure in sequence with WHAT IS TWO TIMES TWO, WHAT IS TWO TIMES THREE, WHAT IS TWO TIMES FOUR and WHAT IS TWO TIMES FIVE? Once the student(s) is consistently answering these questions correctly increase your speed and ask these questions randomly.

5. Point to and touch the '2' at the top of the Answer Card, then the '10' on the bottom row and finally the '20' in the circle (your finger should touch the card under the circle leaving the answer clearly exposed) and say as you are completing this 3 point step, TWO TIMES TEN IS TWENTY, TWO TIMES ELEVEN IS TWENTY-TWO and TWO TIMES TWELVE IS TWENTY-FOUR.

6. Place your finger under each answer in the bottom row and say: TWENTY, TWENTY-TWO, TWENTY-FOUR, sliding your finger along the horizontal line. Do this three times taking approximately 2 seconds to read this row of numbers (answers) each time. The twenty, twenty-two and twenty-four are connected with a horizontal line. This is because these three numbers are all in the twenties. The student is to place his pointer finger at the top of the vertical line where it is touching the bottom of the circle with twenty in it, move it down to the connecting horizontal line while he/she is saying TWENTY and continue moving his/her finger along the horizontal line while saying TWENTY-TWO, TWENTY-FOUR.

7. Have student(s) do the same as you did in step 6 two times. Ask your student(s) if they think that they can remember the answers that they just practiced. If the answer is no, repeat step 6 until they feel confident that they know the answers.

8. Turn to the Two's Practice Card. Ask: WHAT IS TWO TIMES TEN? Place your finger under the circle/graphic that you are asking about. WHAT IS TWO TIMES ELEVEN and WHAT IS TWO TIMES TWELVE? Once the student(s) is consistently answering these questions correctly increase your speed and ask these questions randomly, now including the top row.

9. Point to and touch the '2' at the top of the Answer Card, then the '6' on the middle row and finally the '12' in the circle (your finger should touch the card under the circle leaving the answer clearly exposed) and say: as you are completing this 3 point step, TWO TIMES SIX IS TWELVE, TWO TIMES SEVEN IS FOURTEEN, TWO TIMES EIGHT IS SIXTEEN and TWO TIMES NINE IS EIGHTEEN.

10. Place your finger under each answer in the middle row and say: TWELVE, FOURTEEN, SIXTEEN, EIGHTEEN. Do this two times taking approximately 4 seconds to read this row of numbers (answers) each time.

11. Have student(s) do the same as you did in step 10 two times. Ask your student(s) if they think that they can remember the answers that they just practiced. If the answer is no, repeat step 10 until they feel confident that they know the answers.

12. Turn to the Two's Practice Card. Ask: WHAT IS TWO TIMES SIX? Place your finger under the circle/graphic that you are asking about. Follow this procedure in sequence with WHAT IS TWO TIMES SEVEN, WHAT IS TWO TIMES EIGHT and WHAT IS TWO TIMES NINE? Once the student(s) is consistently answering these questions correctly increase your speed and ask these questions randomly, now including all three rows.

13. Your student(s) are now ready to practice the Two's on paper through the use of worksheets. Representative worksheets are shown in FIGS. 3-8. The students should complete the worksheets. As new concepts are introduced, such as carry over numbers and place holders, you will need to provide a brief explanation. Prompts on each page and many examples throughout the practice worksheets are provided to remind students of new concepts introduced. It is recommended that students complete each section before they go on to learn the next number (i.e. the Two's, the Three's, etc.). Students can progress at their own pace. Students can be assigned one page, multiple pages or as little as one row at a time. Each row of problems was designed to give the student as much exposure to as many different multiplication facts as possible, keeping in mind the student who would not be able to complete more than one row of problems at a time.

For multiplication cards that have numbers connected it is important that students slide their fingers along the connecting lines as they are saying the numbers. For example: on the three's card (not shown) 21 24 27 are connected. When two numbers are connected like 42 49 the student will learn to realize that the next consecutive number cannot be in the 40's because it is not connected so it must be in the 50's. As students become more familiar with the system they will become more aware of associations and ways to remember which number comes before or after another number. Because the answer to every number times ten and eleven are connected students will learn to visualize what is in the 12's circle.

When students are completing practice worksheets, they should first try to recall the answers without looking at the cards. Ask students frequently if the answer they are trying to recall is in the top, middle or bottom row and where it is in that row. Encourage your student(s) to visualize the answer in his/her mind. Next, have students look at the practice card, and finally, look at the Answer Card.

Figure 9:
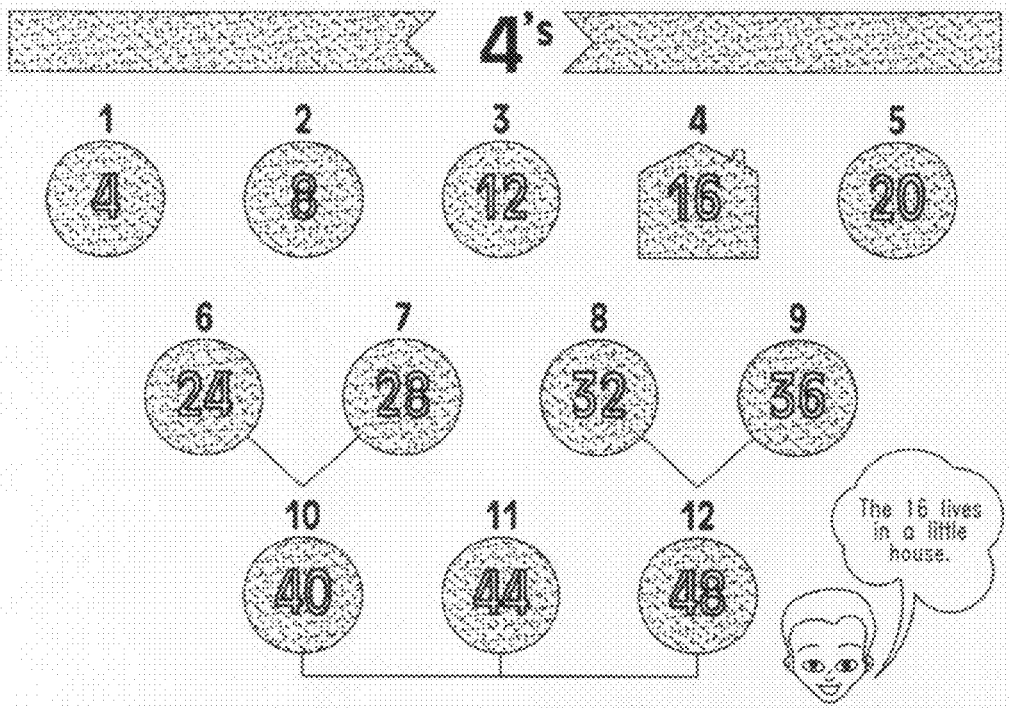
FIGS. 9 and 10 are similar to FIGS. 1 and 2, respectively, but showing answer and practice cards for a different multiplier.
Figure 10:
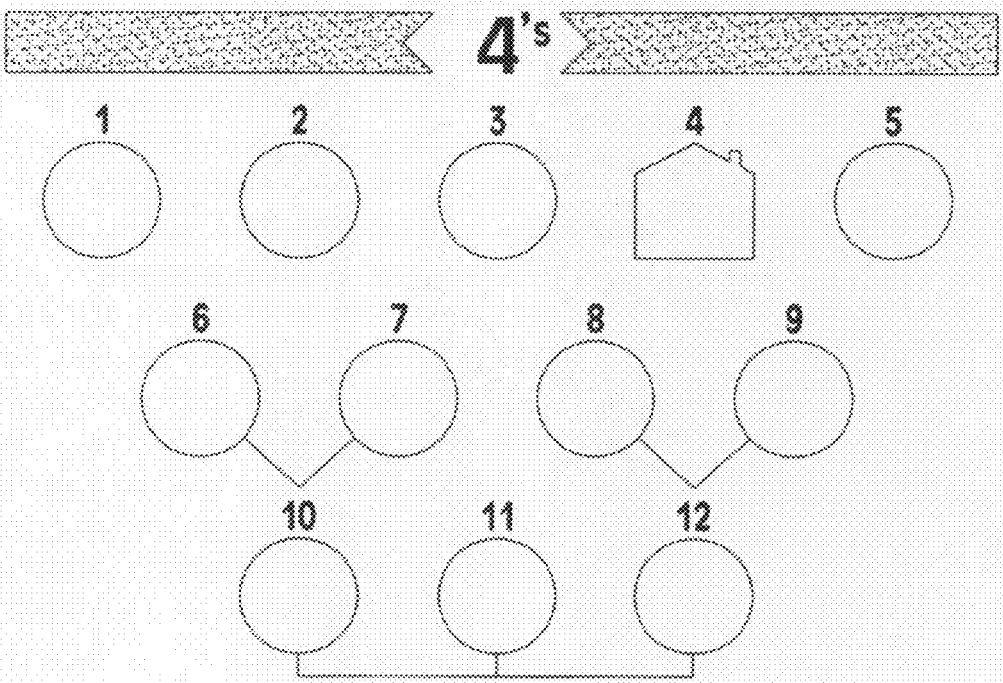

FIGS. 9 and 10 show the answer and practice cards for the selected multiplier "4". Note that indicia are on the cards in the form of V-shaped lines connecting multiplicands 24, 28, and 32, 36 and a straight line connecting 10, 11 and 12. The students are instructed to perform a body movement of some sort in response to the existence or absence of the V connecting line or other indicia employed in association with the numbers.

For example, the students are instructed to stomp their foot to the count of any number not having a connecting line, slide their fingers along the V and horizontal connecting lines, and dip their shoulders on the count of the first number connected by the V connecting line. These body movements reinforce the lessons being taught.

The Ten's

You may follow the same procedure for the Ten's as you have for the One's through the Nine's or you may choose to follow the sequence that the practice worksheets (normally held in a binder) have been organized. Many students learn to count by ten's to one hundred in first grade. The binder should be set up so that the first three pages of worksheets in Section Ten (not shown) only provides practice at ten times zero through ten times ten. This should rapidly build up the student's confidence in learning the products of the Ten's through ten times ten, and thus the student will be able to be successful at learning the first product in the third row of the One's through the Ten's. For the student just beginning to learn the multiplication facts it is recommended that they learn ten times zero through then times ten before learning the Two's. The student may choose to learn ten times eleven and ten times twelve at this time or may choose to wait until he/she has mastered through the Nine's and then come back to ten times eleven and ten times twelve. The remaining worksheets in Section Ten in the binder can be completed when the student learns the last two facts, ten times eleven and ten times twelve.

The Eleven's

You may follow the same procedure for the Eleven's as you have for the One's through the Nine's or you may choose to follow the sequence that the practice worksheets in the binder have been organized. The binder should be set up so that the first three pages of worksheets in Section Eleven only provides practice at eleven times zero through eleven times nine. The Eleven's through eleven times nine are easy to learn once students have learned the One's. Students should be given as many examples as they need so that they master the concept that all you do to get the product of any number times eleven is multiplier times one two times. For eleven times four, you multiply four times one two times. Learning the Eleven's through eleven times nine is a tremendous confidence builder and will enhance the student's success at learning the bottom row of the One's through the Nine's. The student may choose to learn eleven times ten, eleven times eleven and eleven times twelve at this time or may choose to wait until he/she has mastered through the Nine's and then come back to these problems after learning through the Ten's. The remaining worksheets in Section Eleven in the binder can be completed when the student learns the last three facts, eleven times ten, eleven times eleven and eleven times twelve.

The Twelve's

You may follow the same procedure for The Twelve's as you have for the One's through the Nine's or you may choose to follow a sequence in which the practice worksheets in the binder have been organized. The binder should be set up so that the first three pages of worksheets (not shown) in Section Twelve only provide practice at twelve times one through twelve times five to coincide with the top row of the related Answer Card. The next three pages of worksheets (not shown) provide practice at twelve times ten, twelve times eleven and twelve times eleven and twelve times twelve to coincide with the bottom row of the Answer Card (not shown). Pages 7, 8 and 9 (not shown) provide practice at twelve times zero through twelve times five and twelve times ten through twelve times twelve. Pages 10, 11 and 12 (not shown) provide practice at twelve times six through twelve times nine to coincide with the middle row of the Answer Card. The last three pages (not shown) provide practice of twelve times zero through twelve times twelve.

You may now give your student(s) a Pre/Post Assessment to see if there are any sections that would be helpful to review. If not, congratulate your student(s) by giving him/her a Certificate of Completion.

The invention claimed is:

1. A motivational multisensory method utilized by a teacher to teach at least one student numerical multiplication utilizing the senses of vision, hearing and touch, said method comprising the steps of:

presenting a graphic display fixed in a tangible medium to at least one student relating to a selected multiplier, said graphic display being in a predetermined organizational format and showing the selected multiplier, a plurality of different multiplicands arranged sequentially in a plurality of horizontal rows spaced from the showing of the multiplier and a resultant number associated with and positioned in close proximity to each of the multiplicands obtained by multiplying the selected multiplier times the multiplicands with which the resultant number is in close proximity, each said resultant number being enclosed within the boundary of a circle or other graphic symbol;

instructing the at least one student to observe the graphic display, what the teacher will say about the graphic display, what the teacher will point to on the graphic display, and to form a mental picture of numbers and shapes of the graphic display;

consecutively indicating on the graphic display the selected multiplier, a multiplicand and the resultant number obtained by multiplying the indicated multiplicand and the selected multiplier;

while manually indicating the selected multiplier, the multiplicand and the resultant number, causing the at least one student to indicate by stamping a foot or other body movement observable by the teacher the selected multiplier, the multiplicand and the resultant number and reciting aloud with the at least one student the indicated selected multiplier times the indicated multiplicand and the indicated resultant number;

providing said at least one student with a practice card or sheet showing the graphic display previously presented except that no resultant numbers are in the graphic symbols; and instructing the at least one student to identify the resultant numbers belonging in the graphic symbols.

2. The method according to claim 1 wherein the steps are carried out with respect to all the multiplicands and resultant numbers of the graphic display.

3. The method according to claim 1 wherein the manually indicating and reciting aloud steps are repeated.

4. The method according to claim 1 including the additional steps of providing said at least one student with work sheets displaying multiplication tables including said selected multiplier in association with different multiplicands but not showing the resultant number and causing said at least one student to enter the correct resultant numbers.

5. The method according to claim 1 wherein said graphic display is one of a plurality of graphic displays, said graphic displays showing and pertaining to different selected multipliers.

6. The method according to claim 1 wherein lines interconnect at least some of said graphic symbols, said at least one student being caused to touch and manually follow along said lines between the graphic symbols interconnected thereby.

7. The method according to claim 1 wherein said graphic display is imprinted on a card or sheet and wherein said format includes patterns, shapes and graphics associated with said multiplier numbers and said resultant numbers imprinted on said card or sheet, said method including the step of making said at least one student aware of said patterns, shapes and graphics.

8. The method according to claim 7 including the step of projecting an image of said card or sheet.

9. The method according to claim 1 including the additional step of causing said at least one student to move portions of his or her body in a manner observable by the teacher in response to recognition of the existence or absence of certain numerical relationships in the graphic display.

10. The method according to claim 9 including providing connecting lines or other indicia in the graphic display indicating the existence or absence of said numerical relationships, said at least one student being instructed to move the portions of his or her body responsive thereto in a manner observable by the teacher.

\* \* \* \* \*